Oct. 23, 1962
H. A. CARLSON ET AL
3,059,898
CARBURETOR FLOAT VALVE STRUCTURE
Filed Nov. 27, 1959
2 Sheets-Sheet 1
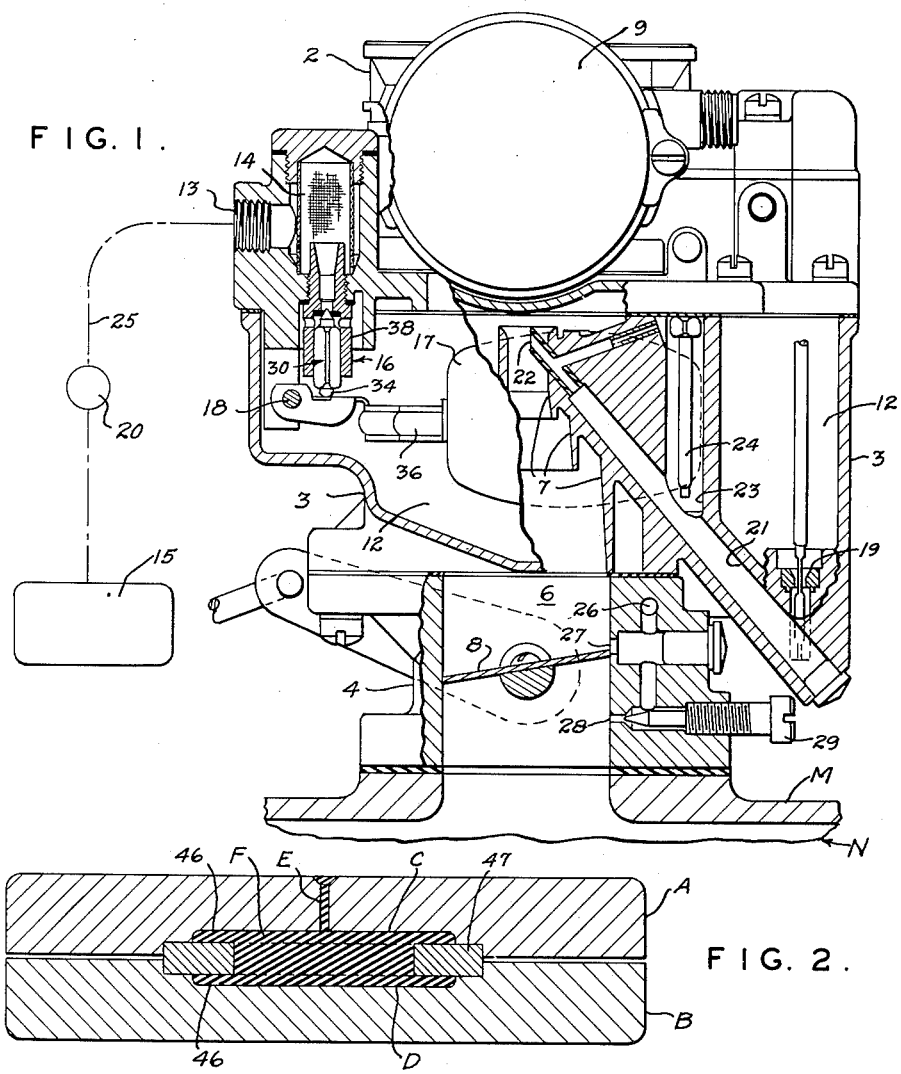
INVENTORS
HAROLD A. CARLSON
BY ALEX N. SZWARGULSKI
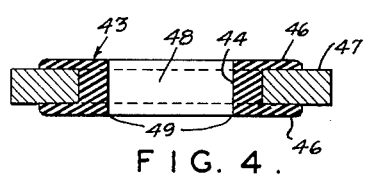
ATTORNEY

INVENTORS
HAROLD A. CARLSON
BY ALEX N. SZWARGULSKI

ATTORNEY

United States Patent Office 3,059,898
Patented Oct. 23, 1962

3,059,898
CARBURETOR FLOAT VALVE STRUCTURE
Harold A. Carlson, Brentwood, and Alex N. Szwargulski, St. Louis, Mo., assignors to ACF Industries, Incorporated, New York, N.Y., a corporation of New Jersey
Filed Nov. 27, 1959, Ser. No. 856,893
2 Claims. (Cl. 251—333)

This invention relates to carburetors for internal combustion engines and more particularly to a float actuated needle valve to control the flow of fuel into a carburetor fuel bowl.

The present invention contemplates the provision of a float actuated needle valve for carburetors in which fuel is adapted to be maintained at a substantially constant level within a fuel bowl. In carburetors of this type, the float actuated needle valve regulates the inflow of fuel to the fuel bowl from an engine driven pump. Heretofore, carburetor float valves have embodied metallic needles engageable with metallic seats and, due to the present trend of decreasing the size of the fuel bowl and float, float oscillations caused by engine vibration and road shock may cause the valve to be opened a sufficient portion of the time to result in flooding of the carburetor. It is also well known that flooding of the carburetor may be caused by small particles of dirt between the needle and seat, abrasion of the needle or seat, or misalignment of the needle and seat.

It is therefore an object of the invention to provide a carburetor float valve adapted to prevent flooding of a carburetor.

Another object of the invention resides in the provision of a float actuated valve structure having a metallic needle engaging a seat of resilient material adapted to absorb vibrations of the needle and float without opening the valve to an inflow of fuel from the pump into the fuel bowl.

A further object of the invention resides in the provision of a fuel inlet valve structure adapted for use with carburetors having relatively small size fuel bowls and floats.

Another object of the invention is to provide a fuel inlet valve adapted to close even though small particles of dirt are engaged between the needle and its seat.

Another object of the invention is to provide a float actuated valve structure which is simple and inexpensive in construction and reliable in operation.

The invention embodies other novel features, details of construction and arrangement of parts which are hereinafter set forth in the specification and claims and illustrated in the accompanying drawings, forming part thereof, wherein:

FIG. 1 is a vertical sectional view illustrating a carburetor provided with a float actuated valve structure embodying features of the invention.

FIG. 2 is a sectional view illustrating the method of molding a synthetic rubber disk onto a metallic washer.

FIG. 3 is a detail sectional view showing the washer and disk assembly.

FIG. 4 is a detail sectional view showing a finished valve seat.

Figure 6:
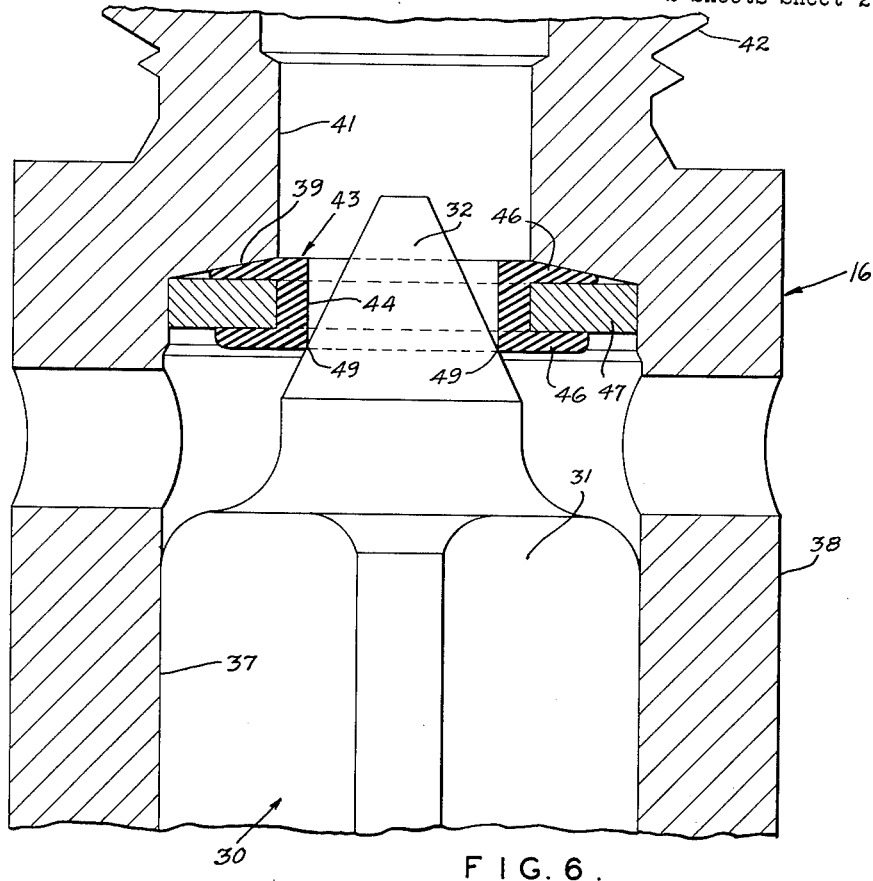
FIG. 6 is an enlarged fragmentary longitudinal section showing the valve structure.
Figure 5:
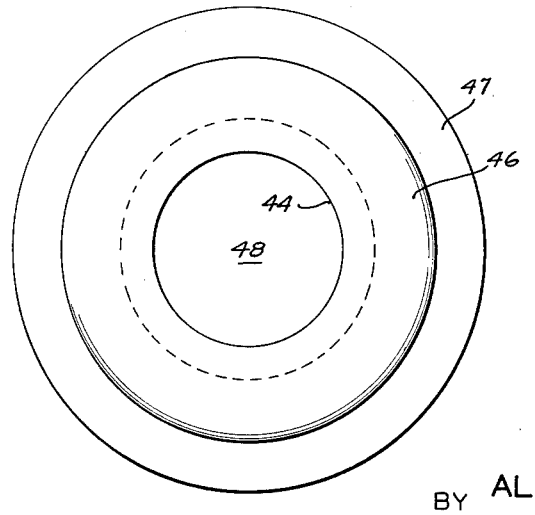
FIG. 5 is a plan view of same.

Referring now to the drawings for a better understanding of the invention, a downdraft carburetor is shown as comprising an air horn section 2, a main body section 3, and an outlet section 4, said sections being secured together and forming a mixture conduit 6 having a stack of venturis 7 in the main body section. The carburetor is mounted on the intake manifold M of an engine N which may be stationary or mounted on a vehicle of any type.

A conventional choke control mechanism 9, responsive to intake suction and temperature, is provided to control the operation of a choke valve provided in the inlet end of the mixture conduit 6. A throttle valve 8 is disposed in the outlet end of the mixture conduit and is connected by means of a suitable linkage to an accelerator pedal for control by the operator.

The main body section 3 is provided with a fuel bowl 12 having a fuel inlet 13 provided with a screen filter 14 and a fuel inlet valve 16. A float 17 is pivotally mounted at 18 within the fuel bowl to actuate the valve to maintain a substantially constant fuel level within the bowl. Fuel is supplied to the bowl from a fuel tank 15 by means of an engine operated fuel pump 20 interposed in a fuel conduit 25 leading to the fuel inlet 13.

A fuel metering orifice 19 leads from the fuel bowl to an upwardly inclined main fuel passage 21 having a main fuel nozzle 22 discharging into the primary venturi. The idling fuel system comprises a fuel well 23 leading upwardly from the main passage 21 and having a metering tube 24 communicating with the idle passage 26 provided with idle ports 27 and 28. An idle adjustment screw 29 is provided for the idle port 28.

As illustrated in FIG. 6, the fuel inlet valve 16 comprises a needle 30 provided with a body 31 of non-circular section having a conical tip 32 on one end thereof to engage a valve seat insert 33, the other end of the body having a rounded head 34 for engagement by the float arm 36. The needle 30 is mounted for reciprocative movement within a cylindrical bore 37 formed in a valve body 38, said bore terminating at a frusto-conical shoulder 39. The valve body 38 is also formed with a bore 41 coaxial with the bore 37 and is externally threaded at 42 for engagement in a threaded aperture leading through a wall of the carburetor to the interior of the fuel bowl.

The valve seat insert 43 is shown as comprising a rink 44 of resilient synthetic rubber-like material having radial parallel flange portions 46—46 straddling the inner peripheral portion of a metallic reinforcing washer 47. In forming the insert 43, the outer peripheral portion of the washer 47 is clamped between upper and lower mold sections A and B having annular cavities C and D, respectively, therein, as illustrated in FIG. 2. The synthetic rubber-like material is then extruded through the opening E into the cavities C and D and cured therein to form a disk F having radial flange portions 46—46 straddling and bonded to the inner peripheral portion of the washer 47, as shown in FIGS. 2 and 3.

After removal of the disk and washer assembly from the mold, a circular opening 48 concentric with the outer periphery of the washer 47 is formed in the disk F by means of a suitable punch and die to provide sharp circular edges 49—49 adapted to yieldably engage the conical tip 32 of the needle 30. The valve seat insert 43 is press-fitted within the bore 37 of the valve body 38 and into leakproof engagement against the frusto-conical shoulder 39, as illustrated in FIG. 6. As illustrated in FIG. 6, it will be noted that one of the flange portions 46 is adapted to be clamped and compressed between the washer 47 and the frusto-conical shoulder 39 to provide an annular seal joint and to insure against accidental displacement of the resilient ring 44 from the washer.

Various resilient synthetic rubber-like materials, such as Viton A, are resistant to gasoline and are now available on the market. Such materials may be purchased in an uncured condition and cured by heat and pressure during a molding operation. While some synthetic rubber-like materials become firmly bonded to clean metal surfaces during molding, suitable adhesives are available for use with other moldable materials to insure a perfect bond to metal parts. Of course, the selected adhesive should also be gasoline resistant.

In the use of the float actuated fuel inlet valve, it will be noted that the frusto-conical tip of the needle engages the sharp circular edge of the resilient insert ring and that the edge of the ring will act to absorb vibratory movements of the needle and float without opening the valve when the fuel level is at or above a predetermined level within the fuel bowl. It will also be noted that particles of dirt on the seat or slight misalignment of the needle and seat will not prevent tight closing of the valve.

Certain structures have been described herein which will fulfill all the objects of the present invention, but it is contemplated that other modifications will be obvious to those skilled in the art which come within the scope of the invention as defined by the appended claims.

We claim:
1. A valve body formed with a fuel passage therethrough, said fuel passage including a cylindrical bore having an annular shoulder intermediate the ends of said fuel passage, a valve seat insert within said bore and including a metallic washer mounted in press-fit engagement with said bore, a ring of resilient synthetic rubber-like material mounted on the inner periphery of said washer, said ring having radial flanges straddling the inner peripheral portions of said washer and spaced a substantial distance from the outer periphery thereof, one of said flanges being compressed between said washer and said shoulder, said ring having at its inner periphery a sharp circular edge formed coaxial to said bore, and a needle valve mounted in said bore for coaxial sliding movement and having a conical tip coaxially formed at one end thereof engaging said sharp circular edge of said ring, the other end of said needle projecting outwardly from said bore for operative engagement therewith.

2. A valve body formed with a fuel passage therethrough, said fuel passage including a cylindrical bore terminating at an annular shoulder intermediate the ends of said fuel inlet passage, a valve seat insert within said bore and including a round metallic washer mounted in press-fit engagement with said bore, a ring of resilient synthetic rubber-like material mounted on the inner periphery of said washer, said ring having radial flanges straddling the inner peripheral portions of said washer and spaced a substantial distance from the outer periphery thereof, one of said flanges being compressed between said washer and said shoulder, said ring having a sharp circular edge at its inner periphery formed coaxial to said bore, and a needle valve mounted in said bore for coaxial sliding movement and having a conical tip coaxially formed at one end thereof engaging said sharp circular edge of said ring, the other end of said needle projecting outwardly from said bore for operative engagement therewith, said shoulder having a frusto-conical surface engaging said one ring flange to accommodate the material of said one ring flange when compressed against said shoulder.

References Cited in the file of this patent

UNITED STATES PATENTS

| | | |
|---|---|---|
| 894,880 | Garlock | Aug. 4, 1908 |
| 1,947,257 | Fritz | Feb. 13, 1934 |
| 2,330,610 | Natter | Sept. 28, 1943 |
| 2,769,454 | Bletcher | Nov. 6, 1956 |
| 2,784,737 | Kelly | Mar. 12, 1957 |
| 2,804,087 | Olson | Aug. 27, 1957 |
| 2,852,291 | Hults | Sept. 16, 1958 |
| 2,874,000 | Nystrom | Feb. 17, 1959 |
| 2,902,045 | Lunn | Sept. 1, 1959 |
| 2,904,877 | Edelen | Sept. 22, 1959 |
| 2,953,347 | Phillips | Sept. 20, 1960 |

FOREIGN PATENTS

| | | |
|---|---|---|
| 623,905 | Great Britain | 1949 |